Figures 1, 2, 3:
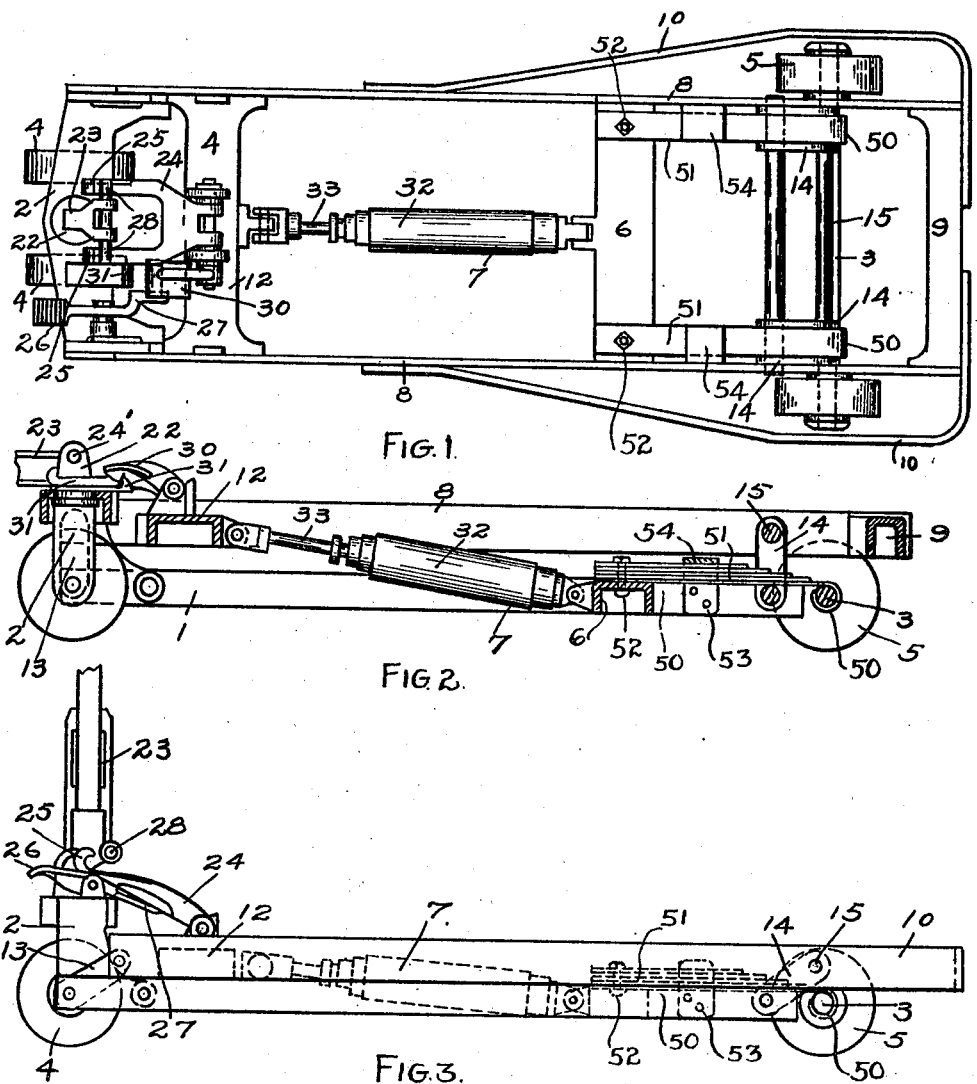

Jan. 29, 1924.

W. STUEBING, JR 1,482,277

LIFTING TRUCK

Filed Feb. 27, 1920

INVENTOR
William Stuebing Jr.
BY
John W. Strehli
ATTORNEY

Patented Jan. 29, 1924.

1,482,277

UNITED STATES PATENT OFFICE.

WILLIAM STUEBING, JR., OF CINCINNATI, OHIO, ASSIGNOR TO THE STEUBING TRUCK COMPANY, A CORPORATION OF OHIO.

LIFTING TRUCK.

Application filed February 27, 1920. Serial No. 361,843.

*To all whom it may concern:*

Be it known that I, WILLIAM STUEBING, Jr., a citizen of the United States, residing at the city of Cincinnati, in the county of Hamilton and State of Ohio, have invented certain new and useful Improvements in Lifting Trucks, of which the following is a specification.

My invention belongs to that class of lifting trucks composed of a wheeled base frame and a lifting frame or elevated platform mounted thereon, which carries the load, and which is raised or elevated by powerful mechanical devices employed to lift the load to be carried; supplementary platforms on which the goods have been previously loaded or placed in course of manufacture are used, enabling the operator to quickly load or unload the truck and readily move it from place to place, loaded or unloaded, through the agency of a steering handle.

Trucks of this class often carry tons of material in weight and consequently they bear very heavily upon the floor, and in passing over the undulated surface of the floor or striking obstacles or raised places on the floor, the jar and impact is beyond the normal travel; thus to a degree the high efficiency of the truck is impaired, the wear and tear is multiplied, damage to the floor is placed at a maximum, and the goods to be handled are often of such a character that they are injured, broken, or impaired in value. The object of my invention is to overcome these objections and produce a truck which can be used under the objectionable floor conditions just set forth and still retain a high degree of efficiency, and operate to all intents and purposes as if said truck were operating on a practically smooth floor.

The salient feature of my invention consists in providing spring means in connection with the truck body, so that the truck will always act in a cushion like manner, whether the lifting platform is in a lowered or in a raised condition. I accomplish this cushion like effect, by placing one end of a spring on the rear axle, and connecting the other end to the lower frame of the truck, in the present instance, more particularly to the rear cross bar or brace to which one end of the checking device is attached. These springs are placed at each side of the truck.

In order to accomplish this result and carry out the intent of the invention, the lower frame is somewhat shortened at the rear to enable the placing of one end of the spring on the axle, that suspension means may be attained to cushion the truck body.

This truck, constructed as herein set forth will obviate the objections hereinbefore referred to, and enable the truck to ride over rough places, cobble stones, undulated surfaces and rough floors; the jarring of the truck will be cut to a minimum. I may use my spring cushion means in connection with any form of lifting truck, especially in connection with my United States Patent No. 1,257,650 and in connection with a truck shown and described in an application I have on file in the United States Patent Office, Serial No. 126,014.

In the accompanying drawing, forming a part of this specification:

Fig. 1, is a plan view of a lifting truck, embodying my invention, Fig. 2, is a side elevation of the same, parts in section and broken away, the elevating platform being up, and Fig. 3, is a side view of truck shown in Fig. 2, the elevating platform being in lowered position, the steering handle partly broken away.

The lower frame of the truck includes side pieces 1, connected at front end to the head 2 of the truck, and at the rear end to a spring. This lower frame is supported at front on wheels 4, and at the rear on wheels 5. A tie bar 6 spans the lower frame rails 1 and carries and supports the rear end of the checking device, 7.

The upper or elevating frame is composed of side rails 8, united at the rear by a tie bar 9 and provided with side wings 10, a tie bar 12 also spanning the top rails 8, for strength and to support the forward end of the checking device 7. The upper frame and lower frame are connected together and the upper frame is movably supported on the lower frame by pivoted forward links 13, and pivoted rear links 14. A small shaft 15 connects the links 14 together.

In carrying out my invention, I mount a spring, between the rear axle 3 and the cross bar or brace 6. The lower rails 1, do not extend to the axle 3, but approximately thereto, and are not connected to the rear axle, as is usually the case. Instead of connecting the lower rails to the rear axle, I connect the lower leaf 50 of the spring to said rear axle 3 and wind the same around said axle to properly connect the same.

In the present instance the spring is composed of five leaves the lower leaf 50 and the four upper leaves 51. Each leaf is shorter than its contiguous lower leaf at the rear, but at front they all meet at the same point and are bolted by bolt 52.

A bracket composed of arms 53 and 54 is bolted to the lower rails 1, and its arm 54 extends inwardly and the spring abuts against the arm 54.

It will readily be observed that the whole truck body is supported and suspended on this spring. The same construction is present at each side of the truck body and the springs are just above the lower rails 1, but inside thereof.

I may make this spring of any shape or contour and connect it to the lower frame of the truck in any manner found most desirable. The springs may be made light or heavy for holding light or heavy loads.

At the forward end of the lower frame, in the head 2, I place a swivel 22 on the top of which I pivot at 24' the steering handle 23 so that the handle can be moved forward and backward.

On the upper platform at its forward end I connect a pivoted link 24; this link is raised by the treadle 26 which has a finger 27; which lifts the link 24 when the treadle 26 is stepped upon and the hooks 25 of the link 24 engage the pins 28 on the handle 23, thus, when the handle 24 is depressed or pulled down the elevating platform moves forward and upwardly until the hook 30 on the elevating platform engages hook 31 on the head 2 of the truck, and this holds the elevating platform in an upper locked position (see Fig. 2); by raising the handle the pins thereon leave the hooks 25 of link 24 and the link drops out of position (into a normal position). By stepping on treadle 26, the hooks 30 and 31 are disengaged and the platform lowers, its rapid descent is interrupted and regulated by the checking device 7, which is a fluid check device formed of a cylinder 32 and a piston rod 33, the piston moving forward and backward in the cylinder 32. This checking device is common to trucks of this character and need not be further described.

It will be seen that by my spring cushion or resilient means, the truck frames, both lower and upper are resiliently supported at all times, and whether the upper frame is in elevated or lowered position, so that any load placed thereon is held on a cushion, or is suspended, whether the truck is in use or standing still. The elevating or upper frame is supported on the lower frame by links, and the lower frame is supported on the rear axle through the medium of the springs attached to the rear axle.

The truck will also travel easier, and more readily, and the operator is enabled to manipulate the same with greater efficiency and convenience.

When a lifting truck heavily loaded passes over an obstruction in a factory it pounds the floor and racks the truck terribly, if said truck however is equipped as herein shown with a resilient frame, it acts the same as if passing over a level floor, as the shock is absorbed.

I do not wish to limit myself to any particular form of spring in carrying out my invention in practice. I may use this form of suspended or resilient platform construction in connection with any form of truck, and may connect the same to a truck in any other manner than herein specifically shown and described.

What I claim as new and my invention and desire to secure by Letters Patent is:

1. A lifting truck including a substantially horizontally disposed base, a wheel supported axle arranged beyond one end of said base and in substantially the same plane as the base, a spring having one of its ends connected to said base and its other end connected to the axle, bearing means mounted on the base and bearing against an intermediate portion of said spring, a platform mounted on said base, and means for elevating said platform.

2. A lifting truck of the kind defined by claim 1 in which said spring includes a number of superposed leaves, the leaves at one end of said spring having their ends in substantial alignment and the other end of said leaves being arranged in stepped relation.

3. A lifting truck including a substantially horizontally disposed base supported at one end by wheels, a wheel axle arranged beyond the other end of said base and in substantially the same plane as the base, leaf springs having one of their ends connected to said base and their other ends connected to said axle, lugs carried by said base and bearing against intermediate portions of said springs, a platform mounted on said base, and means for elevating said platform.

4. A lifting truck including a base, wheels supporting one end of said base, a brace extending across said base, a wheel supported axle, leaf springs having one of their ends connected to said brace and their other ends connected to said axle, lugs projecting from said base and resting upon intermediate portions of said springs, an elevating platform, and means for elevating said platform.

5. A lifting truck including a substantially horizontally disposed base, steering wheels supporting one end of said base, an axle arranged near the opposite end of the base in substantially the same plane as the base, spring means connecting said base and axle to permit relative movement between the base and axle, wheels mounted on said axle, a platform mounted on said base, and means for elevating said platform.

6. A lifting truck including a base having substantially horizontally disposed side bars spaced at their rear ends, steering wheels supporting the front ends of said base, a wheel supported rear axle arranged near the rear ends of said side bars and in substantially the same plane as said base, said base having a cross-bar connecting said side bars, springs connecting said cross-bar to the rear axle and movable in the space between the rear ends of said side bars, an elevating platform arranged on said base, and means for elevating said platform.

7. A lifting truck as claimed in claim 6 in which the side bars are provided with inwardly extending lugs bearing on intermediate portions of said springs.

In testimony whereof, I affix my signature at Cincinnati, Ohio, this 21st day of February, 1920.

WILLIAM STUEBING, Jr.